(12) United States Patent
Yamamoto

(10) Patent No.: US 8,781,837 B2
(45) Date of Patent: Jul. 15, 2014

(54) SPEECH RECOGNITION SYSTEM AND METHOD FOR PLURAL APPLICATIONS

(75) Inventor: Hitoshi Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 1214 days.

(21) Appl. No.: 12/294,150

(22) PCT Filed: Mar. 22, 2007

(86) PCT No.: PCT/JP2007/055811
§ 371 (c)(1),
(2), (4) Date: Sep. 23, 2008

(87) PCT Pub. No.: WO2007/108500
PCT Pub. Date: Sep. 27, 2007

(65) Prior Publication Data
US 2010/0030560 A1    Feb. 4, 2010

(30) Foreign Application Priority Data
Mar. 23, 2006    (JP) .................................. 2006-081345

(51) Int. Cl.
*G10L 21/00*    (2013.01)

(52) U.S. Cl.
USPC ........................................................ 704/270

(58) Field of Classification Search
USPC .................................. 704/270, 231, 256, 257
See application file for complete search history.

(56) References Cited

U.S. PATENT DOCUMENTS

| | | | |
|---|---|---|---|
| 5,632,002 A | | 5/1997 | Hashimoto et al. |
| 5,835,890 A | * | 11/1998 | Matsui et al. ................. 704/255 |
| 5,895,447 A | * | 4/1999 | Ittycheriah et al. ........... 704/231 |
| 6,205,426 B1 | * | 3/2001 | Nguyen et al. ................. 704/255 |
| 6,292,779 B1 | * | 9/2001 | Wilson et al. .................. 704/257 |
| 6,421,641 B1 | * | 7/2002 | Huang et al. ................... 704/250 |
| 6,460,017 B1 | * | 10/2002 | Bub et al. ....................... 704/256 |
| 7,409,342 B2 | | 8/2008 | Kashima et al. |
| 7,603,277 B2 | | 10/2009 | Kashima et al. |
| 7,698,137 B2 | | 4/2010 | Kashima et al. |
| 2002/0135618 A1 | * | 9/2002 | Maes et al. ..................... 345/767 |
| 2004/0148164 A1 | * | 7/2004 | Baker ............................ 704/231 |
| 2004/0267518 A1 | | 12/2004 | Kashima et al. |
| 2006/0149558 A1 | * | 7/2006 | Kahn et al. ..................... 704/278 |
| 2008/0300876 A1 | | 12/2008 | Kashima et al. |
| 2008/0300881 A1 | | 12/2008 | Kashima et al. |
| 2008/0312921 A1 | * | 12/2008 | Axelrod et al. ................ 704/240 |
| 2009/0006088 A1 | * | 1/2009 | Gajic et al. ..................... 704/233 |
| 2010/0061534 A1 | * | 3/2010 | Wang et al. .............. 379/201.03 |
| 2010/0125451 A1 | * | 5/2010 | Napper et al. ....................... 704/9 |
| 2011/0137651 A1 | * | 6/2011 | Rose et al. ..................... 704/240 |

FOREIGN PATENT DOCUMENTS

| | | |
|---|---|---|
| JP | 7-140998 | 6/1995 |
| JP | 11-231889 | 8/1999 |
| JP | 2000-75886 | 3/2000 |
| JP | 2004-53745 | 2/2004 |
| JP | 2004-252121 | 9/2004 |
| JP | 2005024797 | 1/2005 |
| JP | 2005234504 | 9/2005 |

OTHER PUBLICATIONS

JP Notice of the Grounds for Rejection dated Apr. 3, 2012, with English Translation, Application No. 2008-506329.

* cited by examiner

*Primary Examiner* — Jakieda Jackson
(74) *Attorney, Agent, or Firm* — Young & Thompson

(57) ABSTRACT

Disclosed is a speech recognition system in which a common data processing means performs speech recognition of a speech captured by a speech input means to generate recognition result hypotheses which is not biased to one of applications and an adaptation data processing means regenerates recognition result hypotheses, using adaptation data and adaptation processing for each application. The adaptation data processing means provides to each application the recognition result recalculated for each application.

31 Claims, 10 Drawing Sheets

SPEECH RECOGNITION SYSTEM AND METHOD FOR PLURAL APPLICATIONS

TECHNICAL FIELD

The present invention relates to a speech recognition system, a speech recognition method, and a speech recognition program. More specifically, the invention relates to a speech recognition system, a speech recognition method, and a speech recognition program that allow a recognition result to be used by a plurality of applications.

BACKGROUND ART

In order to allow a speech recognition result to be used by an application, it is necessary to configure a speech recognition system using appropriate language models and search means in accordance with a purpose to use the speech recognition result and speech content.

In conventional applications, since a speech and a purpose to use the recognized speech have a one-to-one correspondence, as in a command input system using voice, for example, it is enough to configure one speech recognition system in accordance with this purpose to use the recognized speech.

Recently, however, due to development of a recognition technology of dialogue speech (spoken-utterance speech) between humans, a system for recognizing a certain speech in accordance with various purposes of applications and using the recognized speech has been studied. Among the various applications, there are an application that converts a dialogue to characters word by word in order to record the dialogue, and an application that extracts a specific expression from a dialogue in order to extract information from the dialogue, for example.

In these applications, optimal constituent elements (language information and search means) of a speech recognition system are respectively different. If speech recognition results respectively suited for the applications can be simultaneously provided by one speech recognition system, a usage scene of speech recognition will be extended and convenience will be enhanced.

As a configuration in which one speech recognition system is handled by a plurality of applications, there is the configuration disclosed in Patent Document 1, for example.

FIG. 10 is a diagram showing the configuration disclosed in Patent Document 1. As shown in FIG. 10, this conventional speech recognition system is constituted by a speech recognition unit 12 that recognizes a speech, an application program management table 13 that manages information on a plurality of applications, and a message processing unit 11 that specifies a recognition vocabulary for a speech input and a transmitting destination of a recognition result of speech recognition means, based on the information in the application program management table.

A message sent from an application is interpreted by the message processing unit 11. Based on instructions of the message processing unit 11, an application program management table 13 determines the vocabulary targeted for recognition and the transmitting destination of the recognition result. The speech recognition unit 12 performs speech recognition using the determined vocabulary targeted for recognition, and transmits the result of recognition to an application program 2 determined by the message processing unit 11.

Patent Document 1:
JP Patent Kokai Publication No. JP-A-07-140998

DISCLOSURE OF THE INVENTION

The entire disclosures of the above Patent Document are herein incorporated by reference thereto. The following analysis is given by the present invention.

The conventional system described with reference to FIG. 10 has the following problem.

That is, appropriate speech recognition results cannot be simultaneously transmitted from one speech recognition system to a plurality of the applications.

The reason for that is as follows. The conventional system invariably generates a speech recognition result of only one type without taking into consideration a fact that appropriate language information and appropriate search means differ for each application.

For example, a recognition vocabulary, language models, search means, and the like to be used differ between an application that converts dialogue speech to characters word by word and an application that extracts a specific expression from a dialogue. Thus, the recognition result cannot be simultaneously used by these applications.

Accordingly, an object of the present invention is to provide a speech recognition system, a speech recognition method, and a speech recognition program capable of simultaneously transmitting an appropriate speech recognition result to each of a plurality of applications.

In order to solve the problem described above, the invention disclosed in this application is generally configured as follows:

A speech recognition system according to the present invention is a speech recognition system to which a plurality of applications are connected, and includes a unit that provides a recognition result to each application. The present invention includes a common data processing unit and an adaptive data processing unit. The present invention operates so that recognition result hypotheses generated by the common data processing unit are recalculated by the adaptive data processing unit, using data for each application.

Such a configuration is adopted, and recognition results are simultaneously provided to the applications, respectively, for example.

More specifically, a system according to one aspect of the present invention includes a processing device that rescores recognition result hypotheses in different manners according to a plurality of different supply destinations of applications, respectively, and supplies to a corresponding one of the supply destinations a recognition result determined based on a result of the rescoring. The recognition result hypotheses are obtained as a result of speech recognition of an input speech signal. The present invention allows a plurality of recognition results of the input speech signal that are mutually different according to differences among the respective applications to be output to the supply destinations. The system according to the present invention includes: a common data processing unit that generates the recognition result hypotheses not biased to an application, for a speech supplied from a speech input unit; and an adaptation data processing unit that receives the recognition result hypotheses from the common data processing unit and generates and outputs recognition results individually specialized for the respective applications.

The system according to the present invention includes: a storage device that stores therein data for speech recognition on processing of a speech recognition process common to the applications and data on adaptation processing of the speech recognition process that is mutually different in accordance with the respective applications, and a common data processing unit including:

a feature extraction unit that extracts a feature of a speech supplied from a speech input unit; and a recognition result hypothesis generation unit that generates the recognition result hypotheses for the feature extracted by the feature extraction unit, using the data for speech recognition on the common processing stored in the storage device; and an adaptation data processing unit that includes a plurality of adaptation unit that generate recognition results individually specialized for the respective applications, respectively, using the data on the adaptation processing stored in the storage device and provide the recognition results to the applications of the supply destinations, respectively. The recognition result hypothesis generation unit that generates the recognition result hypotheses is made common to the applications.

The system according to other aspect of the present invention may include:

a storage device that stores therein data for speech recognition on processing of a speech recognition process common to the applications and data on processing of the speech recognition process that is different according to each application;

a common data processing unit including:

a feature extraction unit that extracts a feature of a speech supplied from a speech input unit; and a recognition result hypothesis generation unit that generates the recognition result hypotheses for the feature extracted by the feature extraction unit, using the data for speech recognition on the common processing stored in the storage device; and an adaptation data processing unit including:

an adaptation data management unit that obtains the data for speech recognition from the storage device, further obtains data on adaptation processing for each application, and generates data corresponding to the application of an adaptation destination and the adaptation processing for the application of the adaptation destination; and a common adaptation unit that receives the recognition result hypotheses, executes the adaptation processing on the recognition result hypotheses in accordance with each application, based on the data corresponding to the adaptation processing generated by the adaptation data management unit, and supplies recognition results to the applications of the supply destinations, respectively. The common adaptation unit may be made common to the applications.

The storage device in the system according to the present invention includes:

a speech recognition data storage unit that stores therein acoustic models and language models as the data on the processing of the speech recognition process common to the respective applications; and an adaptation data storage unit that stores therein word weight information on recognition vocabularies and parameters for rescoring the recognition result hypotheses as the data on the processing of the speech recognition process that is different according to each application.

The system according to other aspect of the present invention may further include:

a speech recognition data processing unit that obtains the data for speech recognition from the speech recognition data storage unit, obtains the data for adaptation on each application from the adaptation data storage unit, and generating recognition data obtained by combining the data for speech recognition and the data for adaptation.

In the system according to other aspect of the present invention, the speech recognition data processing unit performs weighted combination of the language models or raises linguistic scores of a specific one of the recognition vocabularies.

A method according to one aspect of the present invention is a speech recognition method using a speech recognition device. The method includes the steps of:

generating recognition result hypotheses for a speech supplied from a speech input unit, the recognition result hypotheses being common to a plurality of applications; and generating and outputting a recognition result individually specialized for each of the applications, upon receipt of the recognition result hypotheses. In the present invention, data for speech recognition on processing of a speech recognition process common to the applications and data on adaptation processing of the speech recognition process that is mutually different in accordance with the respective applications are stored and held in a storage device. The method includes the steps of:

extracting a feature of the speech supplied from the speech input unit;

generating the recognition result hypotheses for the extracted feature, using the data for speech recognition on the common processing stored in the storage device; and generating recognition results for the applications, and generating recognition results suited for the respective corresponding applications, using the data on the adaptation processing stored in the storage device, based on the recognition result hypotheses, and supplying the recognition results to the corresponding applications, respectively.

In the method according to other aspect of the present invention, data for speech recognition on processing of a speech recognition process common to the applications and data on processing of the speech recognition process that is different according to each application are stored and held in a storage device. The first step includes the steps of:

extracting a feature of the speech supplied from the speech input unit; and generating the recognition result hypotheses for the extracted feature, using the data for speech recognition on the common processing stored in the storage device. The second step includes the steps of:

obtaining the data for speech recognition from the storage device, obtaining data on the adaptation processing for each application from the storage device, and generating data corresponding to the application of an adaptation destination and the adaptation processing for the application of the adaptation destination; and receiving the recognition result hypotheses, executing the adaptation processing on the recognition result hypotheses, based on the generated data corresponding to the adaptation processing, and supplying recognition results to the applications, respectively.

A computer program according to other aspect of the present invention is the program for a computer constituting a speech recognition device. The computer includes:

a storage device that stores and holds therein data for speech recognition on processing of a speech recognition process common to a plurality of applications and data on adaptation processing of the speech recognition process that is mutually different in accordance with the respective applications. The program causes the computer to execute the processing of:

extracting a feature of a speech supplied from a speech input unit;

generating recognition result hypotheses for the extracted feature, using the data for speech recognition stored in the storage device; and generating recognition results for the applications, generating recognition results suited for the respective corresponding applications, using the data on the adaptation processing read from the storage device, based on the recognition result hypotheses, and supplying the recognition results to the corresponding applications, respectively.

A computer program according to other aspect of the present invention is the program for a computer constituting a speech recognition device. The computer includes:

a storage device that stores and holds therein data for speech recognition on processing of a speech recognition process common to a plurality of applications and data on adaptation processing of the speech recognition process that is mutually different according to each of the applications.

The program causes the computer to execute the processing of:

extracting a feature of a speech supplied from a speech input unit;

generating recognition result hypotheses for the extracted feature, using the data for speech recognition on the processing common to the applications, read from the storage device;

obtaining the data for speech recognition from the storage device, obtaining data on adaptation processing for each of the applications from the storage device, and generating data corresponding to the application of an adaptation destination and the adaptation processing for the application of the adaptation destination; and receiving the recognition result hypotheses, executing the adaptation processing, based on the generated data appropriate for the adaptation processing, and supplying recognition results to the applications, respectively.

The present invention allows one speech recognition system to provide recognition results processed for a plurality of applications, respectively. The need for providing a plurality of speech recognition systems for the applications is thereby eliminated. As a result, a reduction and simplification of a system configuration such as reduction in a computation amount, reduction in a memory capacity can be implemented.

According to the present invention, adaptation units are made common for applications. The system construction may be thereby facilitated.

Further, according to the present invention, general language models are provided to common data processing means, while language models respectively suited for applications are provided to the adaptation means. Accordingly, recognition accuracy can be improved.

Still other features and advantages of the present invention will become readily apparent to those skilled in this art from the following detailed description in conjunction with the accompanying drawings wherein examples of the invention are shown and described, simply by way of illustration of the mode contemplated of carrying out this invention. As will be realized, the invention is capable of other and different examples, and its several details are capable of modifications in various obvious respects, all without departing from the invention. Accordingly, the drawing and description are to be regarded as illustrative in nature, and not as restrictive.

PREFERRED MODES FOR CARRYING OUT THE INVENTION

Figure 1:
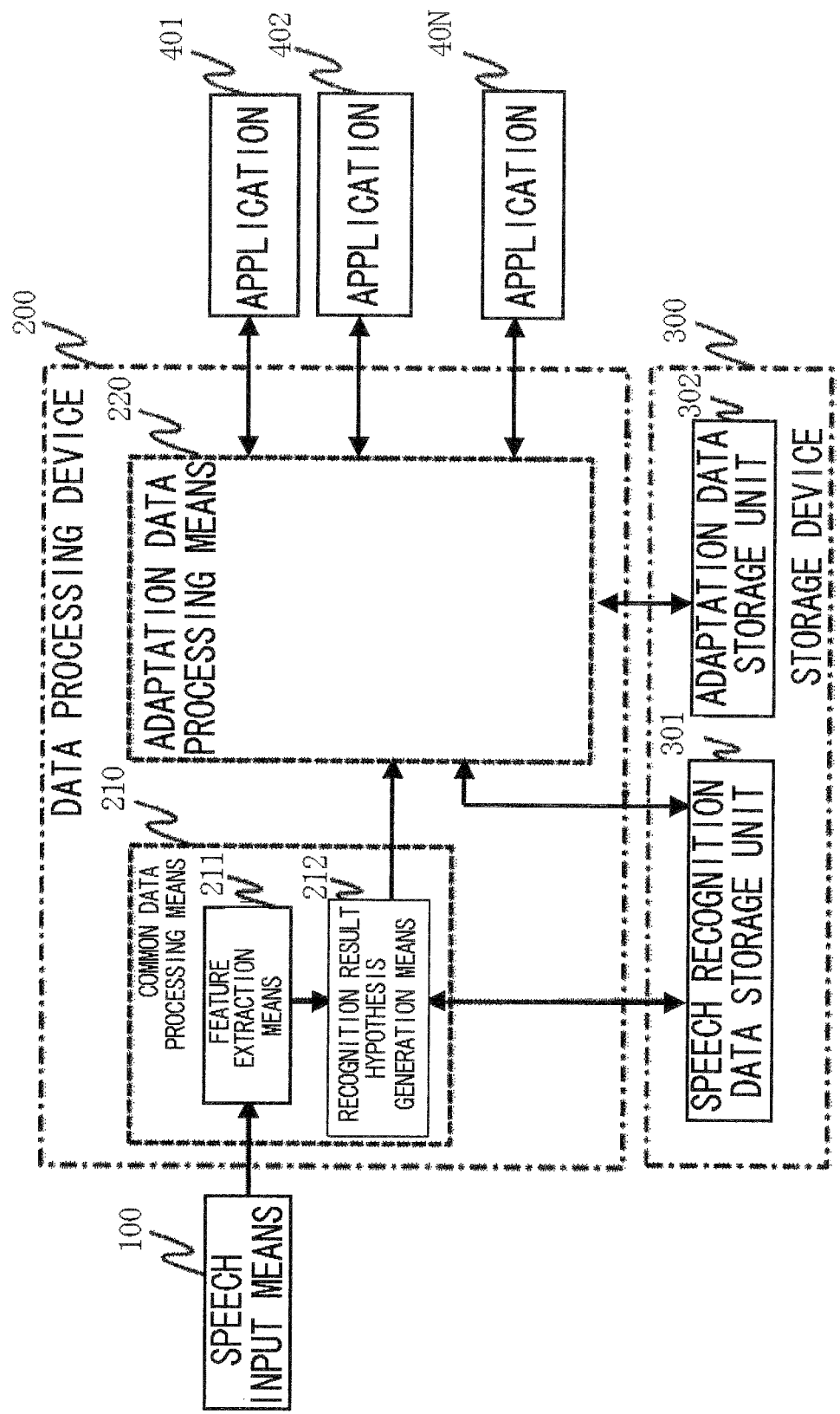
FIG. 1 is a block diagram showing a configuration of a first exemplary embodiment of the present invention.

In order to describe the present invention described above in further detail, preferred modes for carrying out the present invention will be described below with reference to appended drawings. First, a first exemplary embodiment of the present invention will be described in detail with reference to drawings. FIG. 1 is a diagram showing a configuration of a system in the first exemplary embodiment.

Referring to FIG. 1, the system in the first exemplary embodiment of the present invention includes speech input means 100 for receiving a speech, a data processing device 200 that performs a speech recognition process, a storage device 300 that stores data on the speech recognition process, and N applications 401 to 40N each of which uses a speech recognition result.

Each of these means will be described below.

The speech input means 100 is provided for receiving a speech of a speaker. The speech input means 100 captures the speech of the speaker as a speech signal, performs A/D (analog-to-digital) conversion on the speech signal, and then sends the resulting signal to the data processing device 200.

Each of the N applications 401 to 40N receives data including a recognition result from the data processing device 200, and performs specific processing on the data.

The storage device 300 includes a speech recognition data storage unit 301 and an adaptation data storage unit 302.

The speech recognition data storage unit 301 stores data on processing of the speech recognition process common to each of the applications such as:

acoustic models represented by HMMs; and language models represented by N grams.

The adaptation data storage unit 302 stores data on processing of the speech recognition process that is different among the respective applications, such as word weight information on recognition vocabularies and parameters for rescoring a recognition result hypothesis. In this specification, a recognition result candidate handled inside the speech recognition system is referred to as a recognition result hypothesis (which is also referred to as a "recognition hypothesis" or a "speech recognition hypothesis", generated by recognition result hypothesis generation means), and an output of the speech recognition system is referred to as a recognition result.

The data processing device 200 that performs the speech recognition process includes common data processing means (unit) 210 for each application and adaptation data processing means (unit) 220.

The common data processing means 210 includes feature extraction means (unit) 211 and recognition result hypothesis generation means (unit) 212.

The feature extraction means 211 obtains a speech recognition feature of a speech signal sent from the speech input means 100 and sends the obtained speech recognition feature to the recognition result hypothesis generation means 212.

As the feature, a multi-dimensional vector of Mel Frequency Cepstrum Coefficients or the like is employed.

The recognition result hypothesis generation means 212 obtains the feature of the speech from the feature extraction means 211 and obtains data for speech recognition such as the acoustic models or the language models from the speech recognition data storage unit 301. Then, using search calculations, the recognition result hypothesis generation means 212 generates recognition result hypotheses represented by:
    a word graph or
    N best word sequences The adaptation data processing means 220 obtains the recognition result hypotheses (word graph or word sequences) generated by the recognition result hypothesis generation means 212, and obtains from the storage device 300 recognition data (word dictionary for rescoring) such as the language models, corresponding to each of the applications 401 to 40N, and generates recognition results suited for the applications 401 to 40N, respectively.

Next, an operation of the first exemplary embodiment of the present invention will be described in detail, with reference to FIG. 1 and a flowchart in FIG. 2.

First, after storing data on speech recognition processing and data on adaptation processing in the storage device 300 in advance, the system is initialized (in step S101).

When a speaker utters a speech, the speech input means 100 captures the uttered speech as a speech signal, performs the A/D conversion on the speech signal, and sends the resulting signal to the data processing device 200 (in step S102).

The feature of the speech supplied to the data processing device 200 that performs the speech recognition process is extracted by the feature extraction means 211 (in step S103).

The recognition result hypothesis generation means 212 receives the feature extracted by the feature extraction means 211, and generates recognition result hypotheses for the feature, using acoustic models and language models read from the storage device 300 (in step S104).

Next, based on the recognition result hypotheses generated in step S104, the adaptation data processing means 220 generates a recognition result for each application, using the language models and a recognition vocabulary for each application read from the storage device 300, and sends the generated recognition result to each of the applications 401 to 40N (in step S105).

Next, an operation and an effect of the first exemplary embodiment of the present invention will be described.

In the first exemplary embodiment of the present invention, the adaptation data processing means 220 generates a recognition result for each application. Thus, using one speech recognition system, a recognition result obtained by executing an appropriate recognition process for each of a plurality of applications can be always provided.

In the first exemplary embodiment of the present invention, the common data processing means 210 brings together the same processes. Thus, compared with provision of the speech recognition system for each application, the overall usage amount of a memory and the overall computation cost can be reduced. In the first exemplary embodiment shown in FIG. 1, the applications 401 to 40N are shown as configurations connected to the data processing device 200 in parallel via a plurality of ports (or buses) of the data processing device 200. The data processing device 200 may be configured to provide data by time division via one port (or bus). Alternatively, a correspondence relationship between outputs of the data processing device 200 and the applications 401 to 40N may be adjustably varied. That is, the correspondence relationship between the outputs of the data processing device 200 and the applications may be adjustably varied. In this case, a distributor may be included. The distributor distributes a recognition result to a corresponding output destination, among the applications to which recognition results are supplied. The applications 401 to 40N may be constituted from N processing devices each of which receives the recognition result and executes each application. In this case, the N processing devices that execute the applications 401 to 40N may be communicated and connected to the data processing device via a network or the like.

Figure 2:
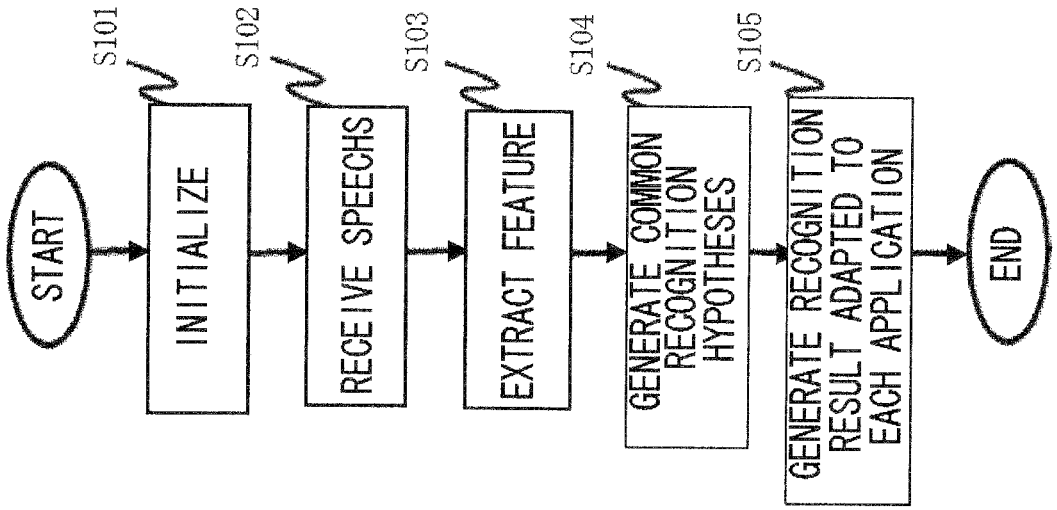
FIG. 2 is a flowchart showing an operation of the exemplary embodiment of the present invention.
Figure 3:
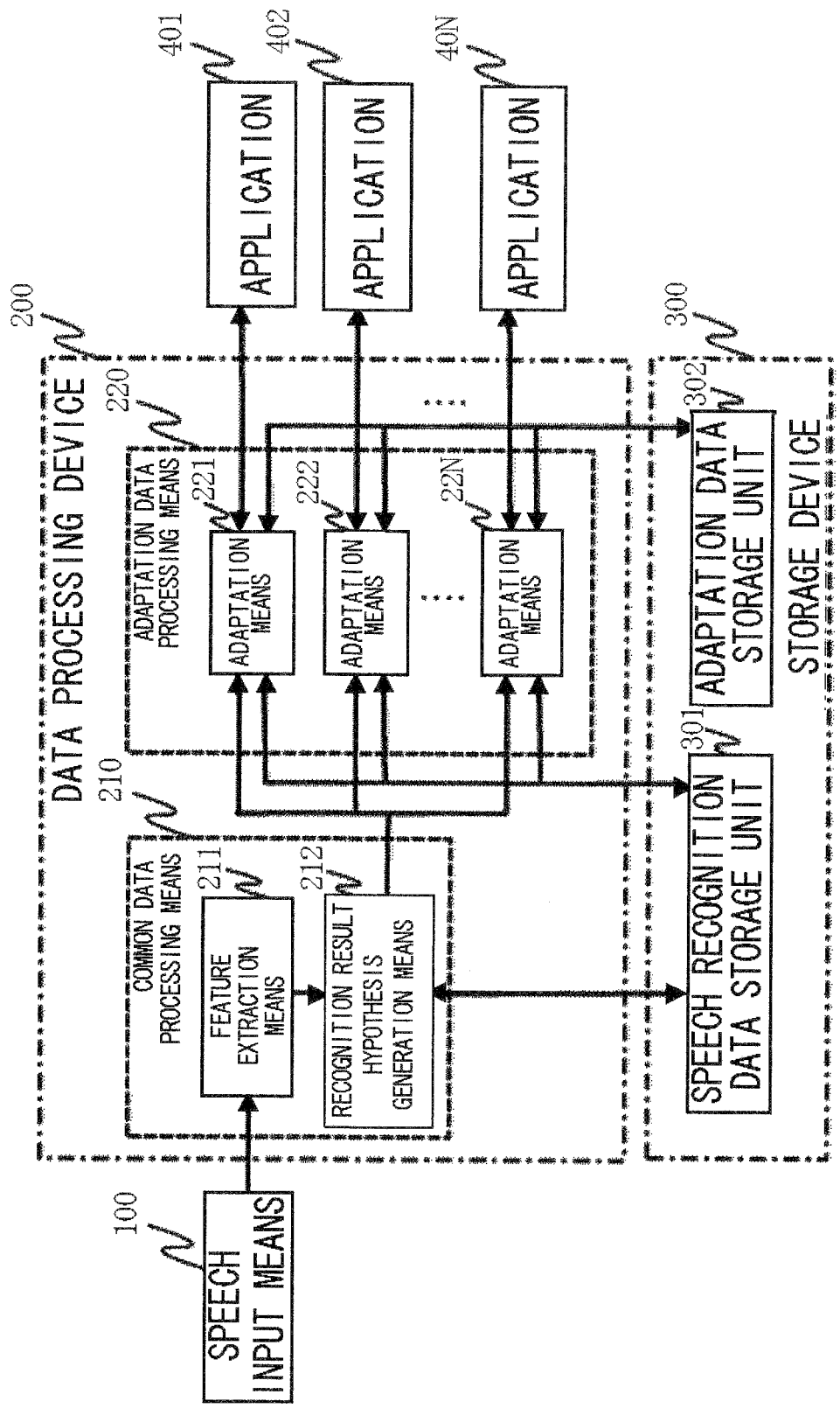
FIG. 3 is a diagram showing a configuration of a second exemplary embodiment of the present invention.

FIG. 3 is a diagram showing a configuration of a second exemplary embodiment of the present invention. This exemplary embodiment constitutes a variation example of the first exemplary embodiment of the present invention. In this exemplary embodiment, the adaptation data processing means 220 in the first exemplary embodiment shown in FIG. 1 includes adaptation means (units) 221 to 22N disposed corresponding to the N applications 401 to 40N, respectively. The adaptation means 221 to 22N individually provide recognition results suited for the applications 401 to 40N, respectively. An operation of this exemplary embodiment is set to be similar to that in FIG. 2. However, in step S105 (for a process of generating a recognition result adapted to each application), the adaptation means 221 to 22N for the respective applications individually generate recognition results for the respective applications, respectively, using language models and a recognition vocabulary for each application, read from the storage device 300, and send the generated recognition results to the applications 401 to 40N, respectively. The adaptation means 221 to 22N may be configured to be obtained by dividing and arranging into N modules the processing which is executed for the N applications 401 to 40N by the adaptation data processing means 220 in FIG. 1. The adaptation means 221 to 22N may be of course configured to execute parallel processing.

Figure 4:
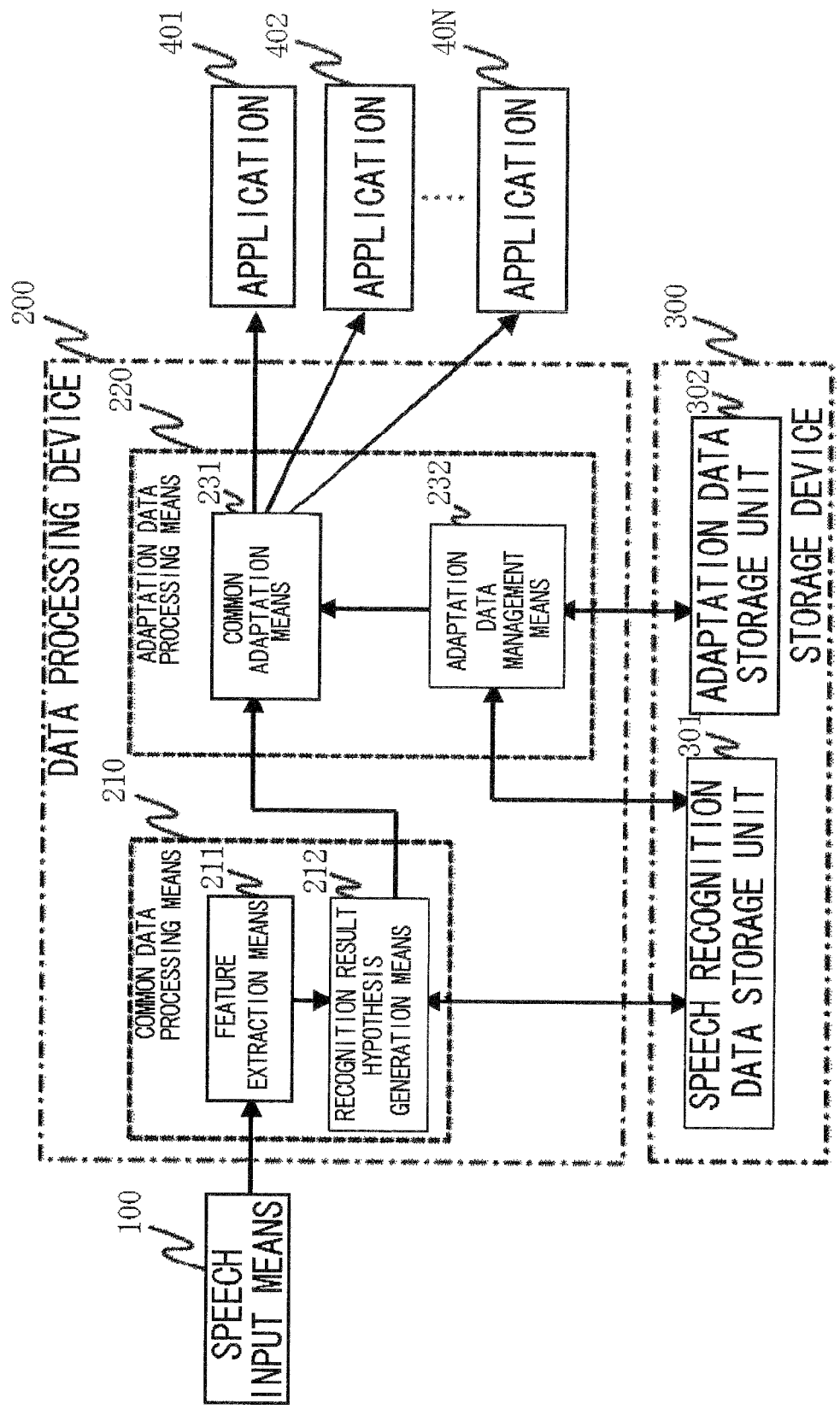
FIG. 4 is a diagram showing a configuration of a third exemplary embodiment of the present invention.

Next, a third exemplary embodiment of the present invention will be described. FIG. 4 is a diagram showing a configuration of the third exemplary embodiment of the present invention. Referring to FIG. 4, a configuration of adaptation data processing means 220 in the third exemplary embodiment of the present invention is different from the adaptation data processing means in the second exemplary embodiment in FIG. 3. That is, in the third exemplary embodiment of the present invention, the adaptation data processing means 220 includes common adaptation means (unit) 231 disposed common to the N applications and adaptation data management means (unit) 232.

The adaptation data management means 232 obtains data for speech recognition from the speech recognition data storage unit 301, and further obtains data on an application for adaption from the adaptation data storage unit 302. Then, the adaptation data management means 232 supplies data appropriate for the application of an adaptation target and adaptation processing of the application of the adaptation target to the common adaptation means 231.

The common adaptation means 231 receives recognition result hypotheses generated by the recognition result hypothesis generation means 212, performs adaptation processing based on an instruction of the adaptation data management means 232, and then transmits a result of the processing to each of the applications 401 to 40N.

Next, an operation of the third exemplary embodiment of the present invention will be described in detail with reference to FIG. 2.

Operations of the speech input means 100, common data processing means 210, storage device 300, and applications 401 to 40N in this exemplary embodiment shown in steps S101 to S104 in FIG. 2 are the same as those in the first and second embodiments. Thus, descriptions of these elements will be omitted.

The common adaptation means 231 receives a recognition result hypotheses generated in step S104, reads the speech recognition data and data for adaptation processing of each application from the storage device 300, based on control of the adaptation data management means 232, and generates and transmits a recognition result for each of the applications 401 to 40N (in step S105).

Next, an effect of the third exemplary embodiment will be described.

In the third exemplary embodiment of the present invention, when there are common processing content portions of the adaptation means such as search means and a recalculation method of recognition result hypothesis in a speech recognition process, those common processing content portions are made common. For this reason, just by switching data for adaptation processing to be given to the common adaptation means 231 by the adaptation data management means 220, a recognition result for each application can be generated. Construction of the system is thereby facilitated, and flexibility and expandability of the system are thereby improved.

Figure 5:
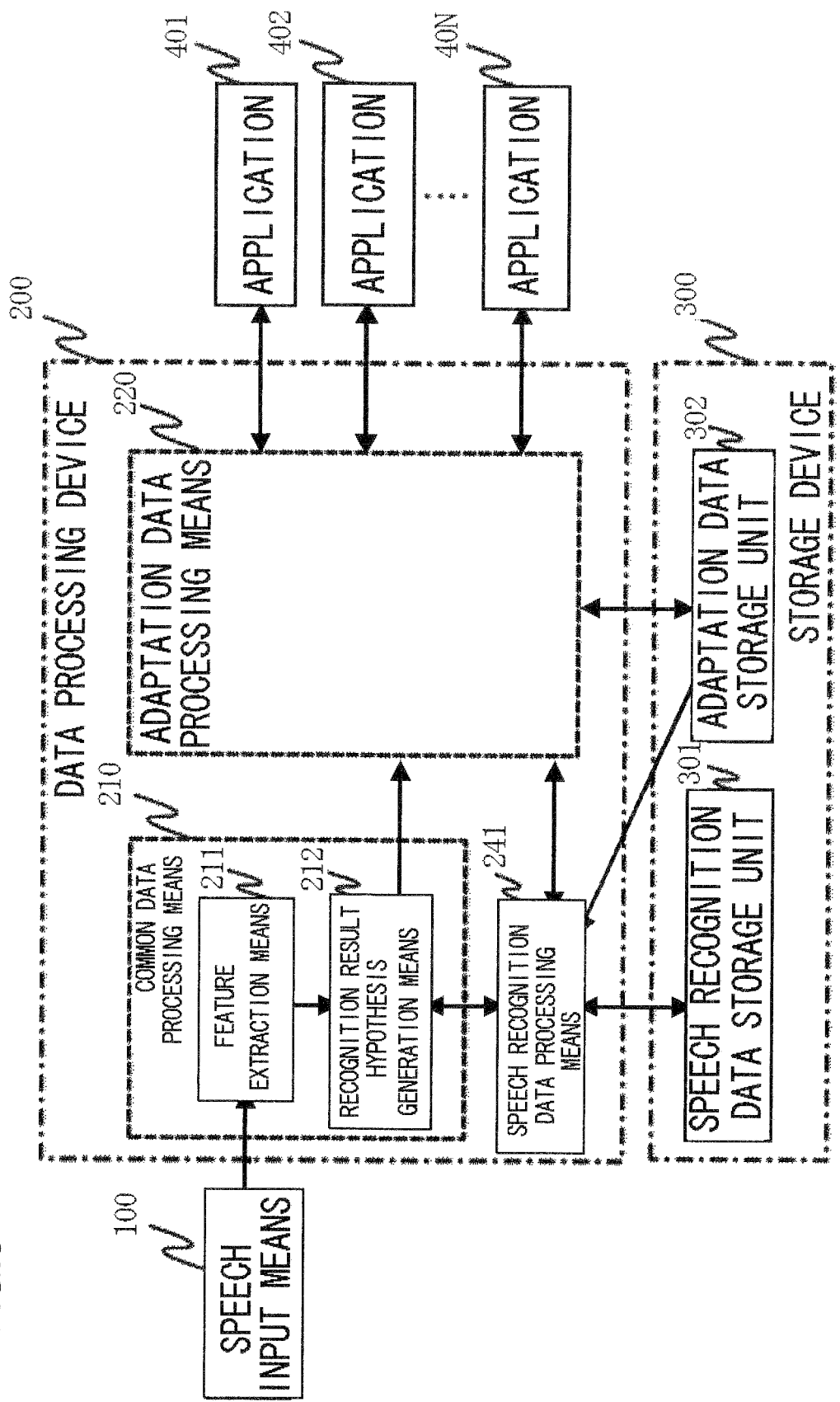
FIG. 5 is a diagram showing a configuration of a fourth exemplary embodiment of the present invention.

Next, a fourth exemplary embodiment of the present invention will be described. FIG. 5 is a diagram showing a configuration of the fourth exemplary embodiment of the present invention. Referring to FIG. 5, in the fourth exemplary embodiment of the present invention, the data processing device 200 includes speech recognition data processing means (unit) 241, in addition to device configurations in the first to third exemplary embodiments shown in FIGS. 1, 3, and 4.

The speech recognition data processing means 241 obtains data for speech recognition from the speech recognition data storage unit 301, obtains data for adaptation on each application from the adaptation data storage unit 302, and produces recognition data obtained by combining the data for speech recognition and the data for adaptation.

As a method of the combination, the process as follows, for example, is applied:
 weighted combination of a plurality of language models, or
 raising linguistic scores of a specific recognition vocabulary An operation of the fourth exemplary embodiment of the present invention will be described in detail with reference to FIG. 2.

Operations of the speech input means 100, storage device 300, and applications 401 to 40N shown in steps S101 to S103 in FIG. 2 are the same as those in the first exemplary embodiment. Thus, description of these elements will be omitted.

The recognition result hypothesis generation means 212 of the common data processing means 210 generates recognition result hypotheses for the feature generated in step S103, using language models generated by reading out the data for speech recognition and the data for adaptation from the storage device 300 by the speech recognition data processing means 241 (in step S104).

The adaptation data processing means 220 receives the recognition result hypotheses generated in step 104, and generates a recognition result to be used by each of the applications 401 to 40N, using language models generated by reading the speech recognition data and the data for adaptation from the storage device 300 (in step S105)

In steps S104 and S105, for example, the common data processing means 210 may generate recognition result hypotheses that evenly include the recognition vocabularies of the respective applications. Then, the adaptation data processing means 220 may rank the recognition result hypotheses suited for each application, using the recognition vocabulary of each application.

Next, an operation and an effect of the fourth exemplary embodiment of the present invention will be described.

In this exemplary embodiment, the general language models for the common data processing means are provided by the speech recognition data processing means 241. Then, the language models suited for each application are provided to the adaptation data processing means 220 by the speech recognition data processing means 241. Accordingly, efficient recognition result hypotheses (intermediate results) can be generated, and highly accurate adaptation to the respective applications can be made.

Figure 6:
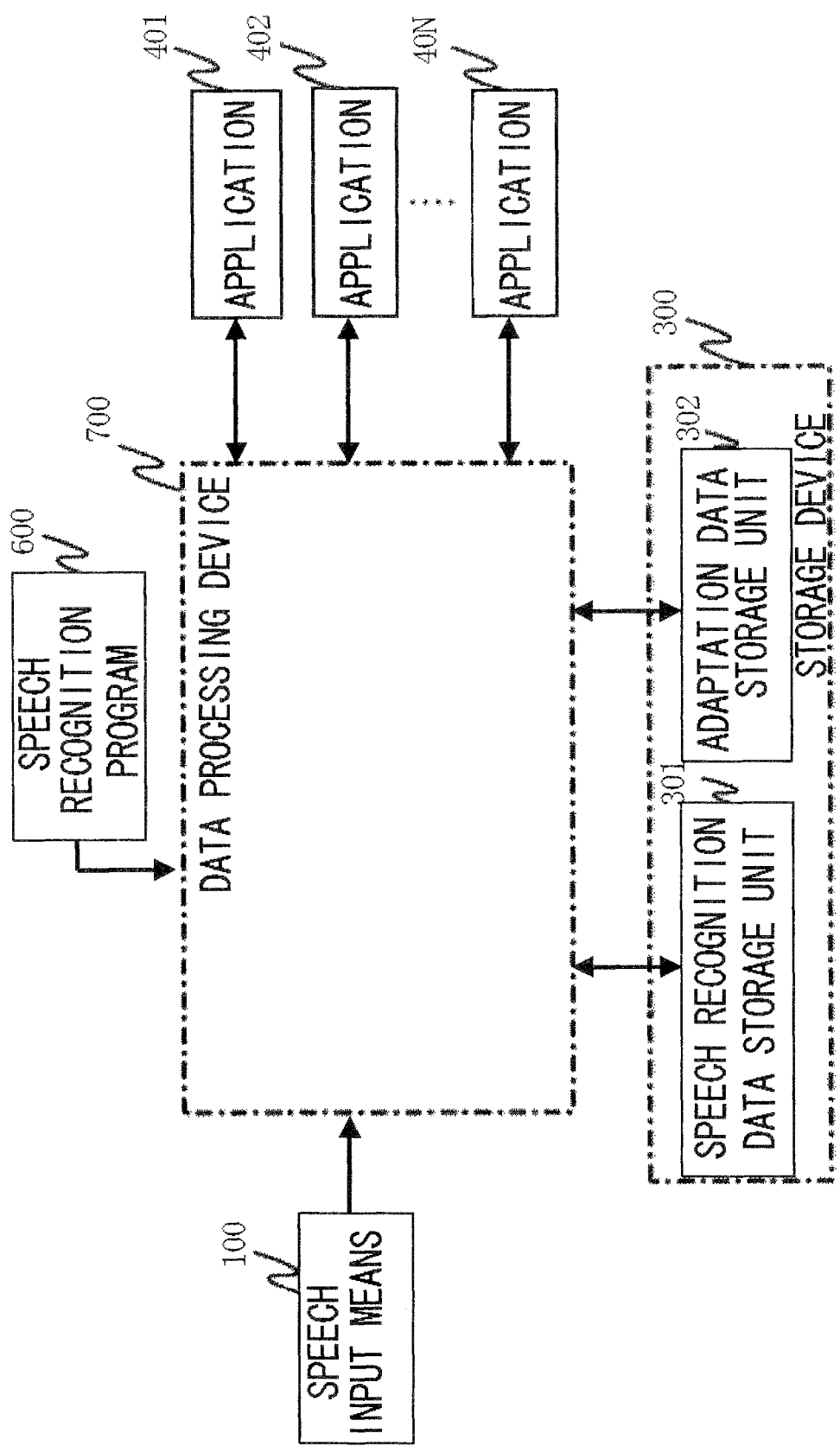
FIG. 6 is a diagram showing a configuration of a fifth exemplary embodiment of the present invention.

Next, a fifth exemplary embodiment of the present invention will be described. Referring to FIG. 6, the fifth exemplary embodiment of the present invention includes the speech input means 100, storage device 300, and applications 401 to 40N, as in the first through fourth embodiments. A speech recognition program 600, which is read into a data processing device 700, controls operations of the data processing device 700. The data processing device 700 executes processes that are the same as those executed by the data processing device 200 in each of the first through fourth exemplary embodiments by the control of the speech recognition program 600. Some specific examples to which the present invention has been applied will be described.

EXAMPLES

A first example of the present invention corresponds to the second exemplary embodiment shown in FIG. 3. This example shows an example where the second exemplary embodiment has been applied to recognition of dialogue speech between a client and a person in charge (operator) in a contact center.

As the speech input means 100 in FIG. 3, a headset microphone or a telephone may be pointed out. The speech of the client who accesses the contact center is supplied via the telephone such as a fixed phone, a cellular phone, or an IP phone. Then, the speech of the client is A/D converted, and is then sent to the data processing device 200 via a telephone line or an IP network.

The speech of the operator in the contact center is supplied via the headset microphone that is regularly used by the operator. Then, the speech of the operator that passes through the telephone line or the IP network is branched and is then extracted. The extracted speech is A/D converted and is then sent to the data processing device 200.

When branching is performed between the telephone and the headset microphone, a speech having better quality than the one that has passed through the telephone line may be extracted. This is preferable in order to improve performance of speech recognition.

As the storage device 300, a storage device built into the terminal of each operator or a database device for the overall contact center is used. This storage device 300 includes the speech recognition data storage unit 301 and the adaptation data storage unit 302.

The speech recognition data storage means 301 stores data on processing of the speech recognition process common to each application such as:

acoustic models represented by HMMs (Hidden Markov Models); and language models represented by N grams.

The adaptation data storage unit 302 stores data on processing of the speech recognition process that is different among the respective applications, such as: word weight information on a vocabulary to be used by each application; and parameters for rescoring a recognition result hypothesis.

The applications 401 to 40N are programs (application programs), each of which obtains a speech recognition result from the data processing device 200 and performs an original process. On one speech, various applications as follows, for example, simultaneously operate:

an application that converts a current call to characters and displays the characters on the terminal of the operator;

an application that extracts a keyword from the call and performs information retrieval on the terminal of the operator;

an application that presents information on a call that has been converted to characters on the terminal of a supervisor (supervisor) of the operator; and an application that detects a situation that needs help for the operator and presents the situation on the terminal of the supervisor of the operator A computer including an arithmetic unit is employed for the data processing device 200. The data processing device 200 is configured as a terminal computer of each operator or a server dedicated to speech recognition of the overall contact center. In the data processing device 200, main data processing which relates to carrying out the present invention is performed.

The common data processing means 210 performs processes capable of being made common to the respective applications.

In this example, a process of extracting a feature from a speech and a process of generating recognition result hypotheses are made common. The processing amount of the recognition result hypothesis generation process in particular is the largest. Thus, when the recognition result hypothesis generation process can be made common, an effect when one speech recognition system accommodates a plurality of applications is large.

A speech which has been input to the data processing device 200 is first converted into a feature by the feature extraction means 211.

As the feature, a parameter that represents the frequency spectrum characteristic of the speech is used. For example, the parameter as follows is used:

a multidimensional vector of Mel Frequency Cepstrum Coefficients (MFCCs);

speech power; or a speech pitch frequency

The recognition result hypothesis generation means 212 searches for a most likely word sequence for the given feature of the speech, using a score obtained by:

acoustic models such as the HMMs; or language models such as the N-grams and grammatical constraint.

For the search, a common approach in speech recognition, such as a frame synchronization beam search, may be used.

Herein, as recognition result hypotheses, a plurality of candidate word sequences represented as follows are generated:

N-best word sequences; or a word graph.

Further, to each word, attribute information as follows is added, as necessary:

word class, Part-of-Speech pronunciation search score, or confidence measure.

The adaptation data processing means 220 determines recognition results appropriate for the respective applications, using the adaptation means 221 to 22N, based on the recognition result hypotheses generated by the common data processing means 210.

In the application that converts a call into characters, for example, the recognition performance may be improved by the following method of:

performing recalculation using more detailed models or language models adapted to the call; or recalculating ranking using confidence measure of words in hypotheses.

In the application that extracts a specific expression from a call, more accurate detection may be performed by the following method of:

performing recalculation on recognition result hypotheses alone in which the specific expression is included; or performing search again using language models where linguistic scores of pertinent words are raised or linguistic score of words that are not targeted for extraction are reduced.

Figure 7:
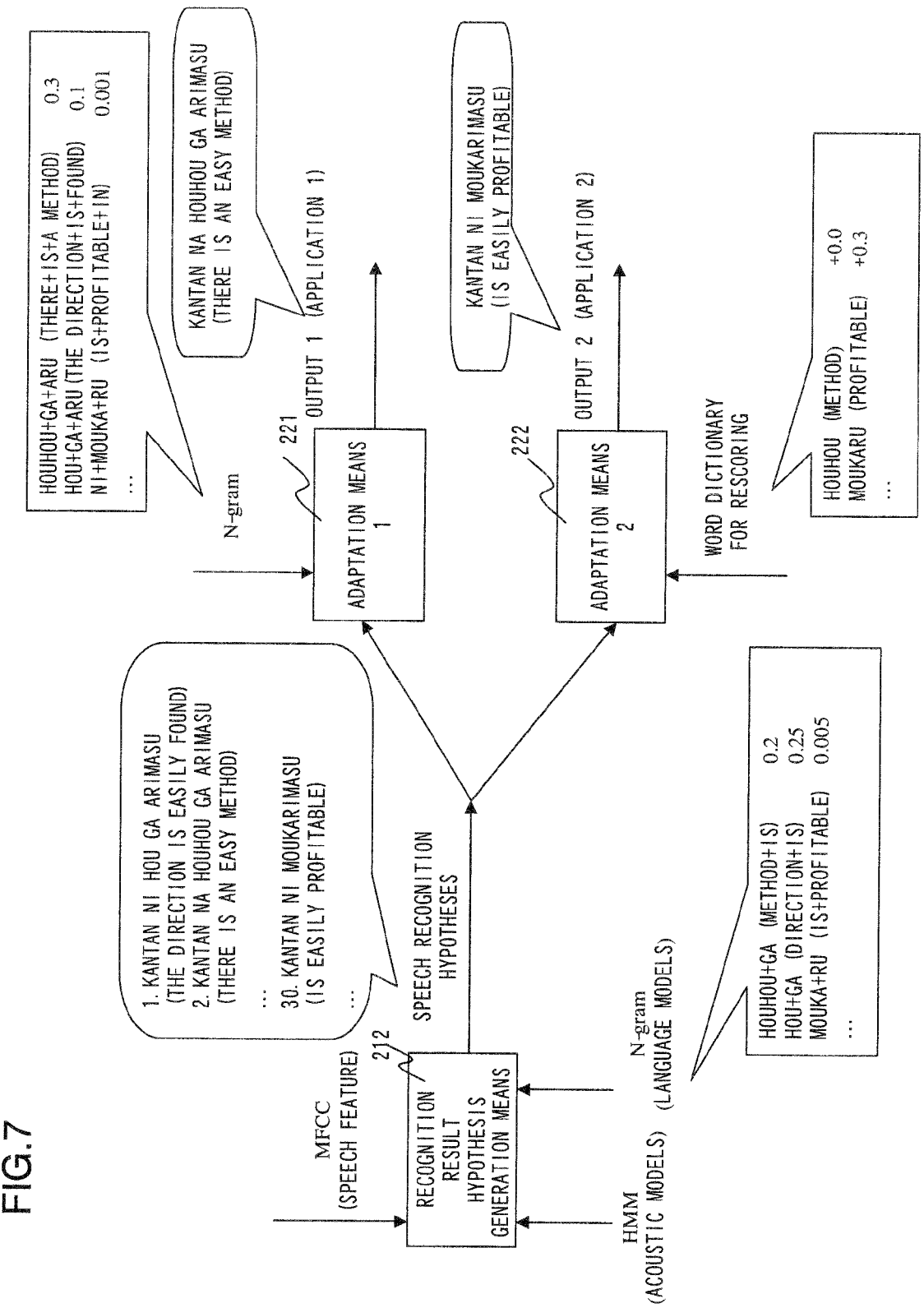
FIG. 7 is a diagram for explaining an operation of a first embodiment of the present invention.

FIG. 7 is a schematic diagram explaining an operation example of the first example of the present invention. Corresponding to two applications, the two adaptation means 221 and 222 (corresponding to a case where the number N is set to two in FIG. 3) are provided. Upon receipt of the feature of a speech (MFCCs) from the feature extraction means 211, the recognition result hypothesis generation means 212 refers to the HMMs (acoustic models) and the N-grams (language models) in the speech recognition data storage unit 301. The recognition result hypothesis generation means 212 ranks candidates in the (likely) order of likelihood, based on N-grams (where occurrence probabilities of "houhou+ga (method+is)", "hou+ga (direction+is)", and "mouka+ru (is+profitable)" are 0.2, 0.25, and 0.005, respectively). Then, as recognition result hypotheses (speech recognition hypotheses), the recognition result hypothesis generation means 212 outputs 1. "kantan ni hou ga arimasu (The direction is easily found).", 2. "kantan na houhou ga arimasu (There is an easy method).", . . . 30. "kantan ni moukarimasu (is easily profitable)", for example. The number of the candidates output as the recognition result hypotheses (speech recognition hypotheses) is not of course limited to 30.

The adaptation means 221 refers to the adaptation data storage unit 302, and rescores the above-mentioned recognition result hypotheses (speech recognition hypotheses) indicated by reference numerals 1 through 30, based on N-grams stored corresponding to first adaptation means or the adaptation means (221) (where occurrence probabilities (co-occurrence probabilities) of "houhou+ga+aru (There+is+a method).", "hou+ga+aru (The direction+is+found).", and "ni+mouka+ru (is+profitable+in)" are 0.3, 0.1, and 0.001, respectively). Then, the adaptation means 221 selects and outputs the recognition result hypothesis of "There is an easy method" having a highest score to the corresponding application (indicated by reference numeral 401 in FIG. 3) as an output 1 (to an application 1).

The adaptation means 222 refers to the adaptation data storage unit 302, and rescores the above-mentioned recognition result hypotheses (speech recognition hypotheses) indicated by reference numerals 1 through 30, based on a word dictionary for rescoring stored corresponding to second adaptation means or the second adaptation means (222) (where scores of "houhou (method)" and "moukaru (is profitable)" are 0.0, and +0.3, respectively). Then, the adaptation means 222 selects and outputs the recognition result hypothesis of "kantan ni moukarimasu (is easily profitable)" having a highest score as an output 2 (to the application 2), and supplies the selected recognition result hypothesis to the corresponding application (indicated by reference numeral 402 in FIG. 3).

Next, a second example of the present invention will be described. This example corresponds to the third exemplary embodiment described with reference to FIG. 4. If a recalculation method used when a recognition result adapted to each application is derived from recognition result hypotheses generated by the common data processing means 210 is common to the respective applications, application adaptation becomes possible by switching data such as language models. This data management is performed by the adaptation data management means 232. The adaptation data management means 232 supplies appropriate data to the common adaptation means 232. In the common adaptation means, use of an approach similar to that adopted by the adaptation means 221 to 22N may be adopted.

Figure 8:
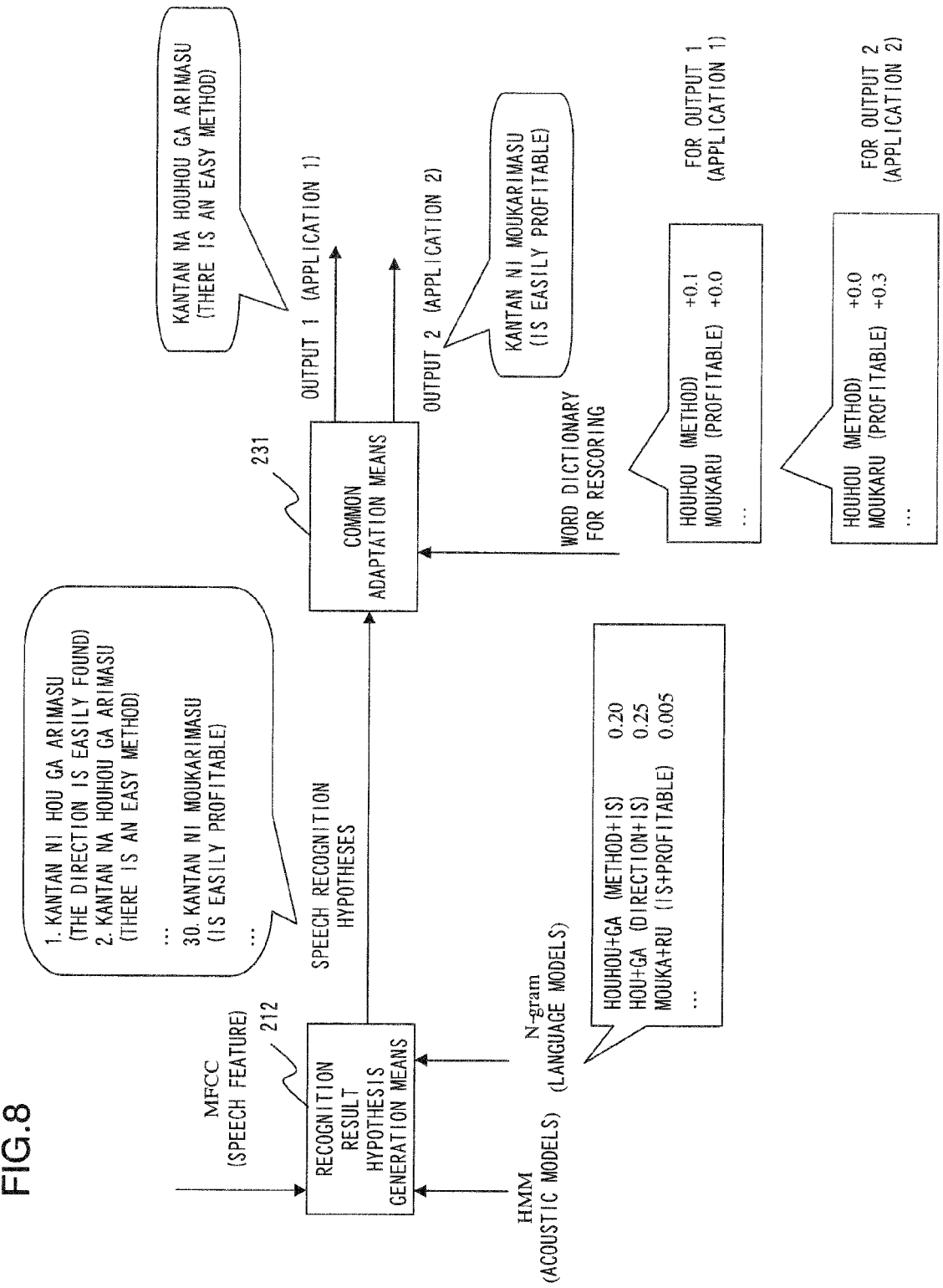
FIG. 8 is a diagram for explaining an operation of a second embodiment of the present invention.

FIG. 8 is a schematic diagram showing an operation example of the second example of the present invention. Referring to FIG. 8, the common adaptation means 231 (corresponding to the component indicated by reference numeral 231 in FIG. 4) is provided for outputs 1 and 2 to the two applications. In this example, upon receipt of the feature of a speech (MFCCs) from the feature extraction means 211 in FIG. 4, the recognition result hypothesis generation means 212 refers to HMMs (acoustic models) and N-grams (language models) in the speech recognition data storage unit 301. The recognition result hypothesis generation means 212 then sorts candidates in descending order of score, based on N-grams (where occurrence probabilities of "houhou+ga (method+is)", "hou+ga (direction+is)", and "mouka+ru (is+profitable)" are 0.2, 0.25, and 0.005, respectively). Then, as recognition result hypotheses (speech recognition hypotheses), the recognition result hypothesis generation means 212 outputs 1. "kantan ni hou ga arimasu (The direction is easily found).", 2. "kantan na houhou ga arimasu (There is an easy method).", . . . 30. "kantan ni moukarimasu (is easily profitable)", for example.

The adaptation data management means 232 refers to the adaptation data storage unit 302, and generates a word dictionary for rescoring (where scores of "houhou (method)" and "moukaru (is profitable)" are +0.1, +0.0, respectively) for the output 1 (to an application 1). Then, for the output 2 (to an application 2), the adaptation data management means 232 generates a word dictionary for rescoring (where scores of "houhou (method)" and "moukaru (is profitable)" are +0.0, +0.3, respectively). The adaptation data management means 232 then supplies the generated word dictionaries for rescoring to the common adaptation means 231.

The common adaptation means 231 selects and outputs to the corresponding application (indicated by reference numeral 401 in FIG. 4) the recognition result hypothesis of "kantan na houhou ga arimasu (There is an easy method)." having a highest score, for the output 1 (to the application 1).

The common adaptation means 231 selects and outputs to the corresponding application (indicated by reference numeral 402 in FIG. 4) the recognition result hypothesis of "kantan ni moukarimasu (is easily profitable)" having a highest score, for the output 2 (to the application 2).

Next, a third example will be described. The third example corresponds to the fourth exemplary embodiment described with reference to FIG. 5.

When generating recognition result hypotheses, a vocabulary targeted for recognition may differ in each application. In an application that converts calls into characters without alteration, for example, expressions that often appear in the calls constitute the vocabulary for recognition. In an application that detects an inappropriate operator speech, a lot of expressions that seldom appear in calls are included in the vocabulary for recognition.

In order to accommodate these applications, it is necessary to include both of the vocabularies (vocabularies for recognition each constituted from the expressions that often appear in the calls and the expressions that seldom appear in the calls) in the vocabulary for recognition.

Further, it is necessary to unify language models in a balanced manner and adjust scores so as to prevent recognition result hypotheses from being biased to the vocabulary for one of the applications.

By executing the process described above by the speech recognition data processing means 241, adaptation to the larger number of types of applications becomes possible. Similarly, in the speech recognition result hypothesis generation means 212 as well, it may be so designed that a threshold of pruning search is changed according to the vocabulary in order to generate recognition result not biased to each one of the applications.

When the common data processing means 210 has used language models generated by the speech recognition data processing means 241, the speech recognition data processing means 241 similarly regenerates language models or the like for each application. Then, by using the regenerated language models for each application by the adaptation data processing means 220, recognition performance may be improved.

In the example described before, when converting ordinary calls to characters, more accurate recognition may be implemented by using language models for a recognition vocabulary that does not include inappropriate expressions that seldom appear in the calls.

Conversely, in the application example of detecting an appropriate speech, language models, where the inappropriate expressions that seldom appear in the calls are set to have larger scores, should be used.

It is so arranged that the recognition result hypotheses output by the common data processing means 210 are derived without excessively using the vocabulary for a specific application. The adaptation data processing means 220 specializes these recognition result hypotheses for each operation and performs recalculation.

Figure 9:
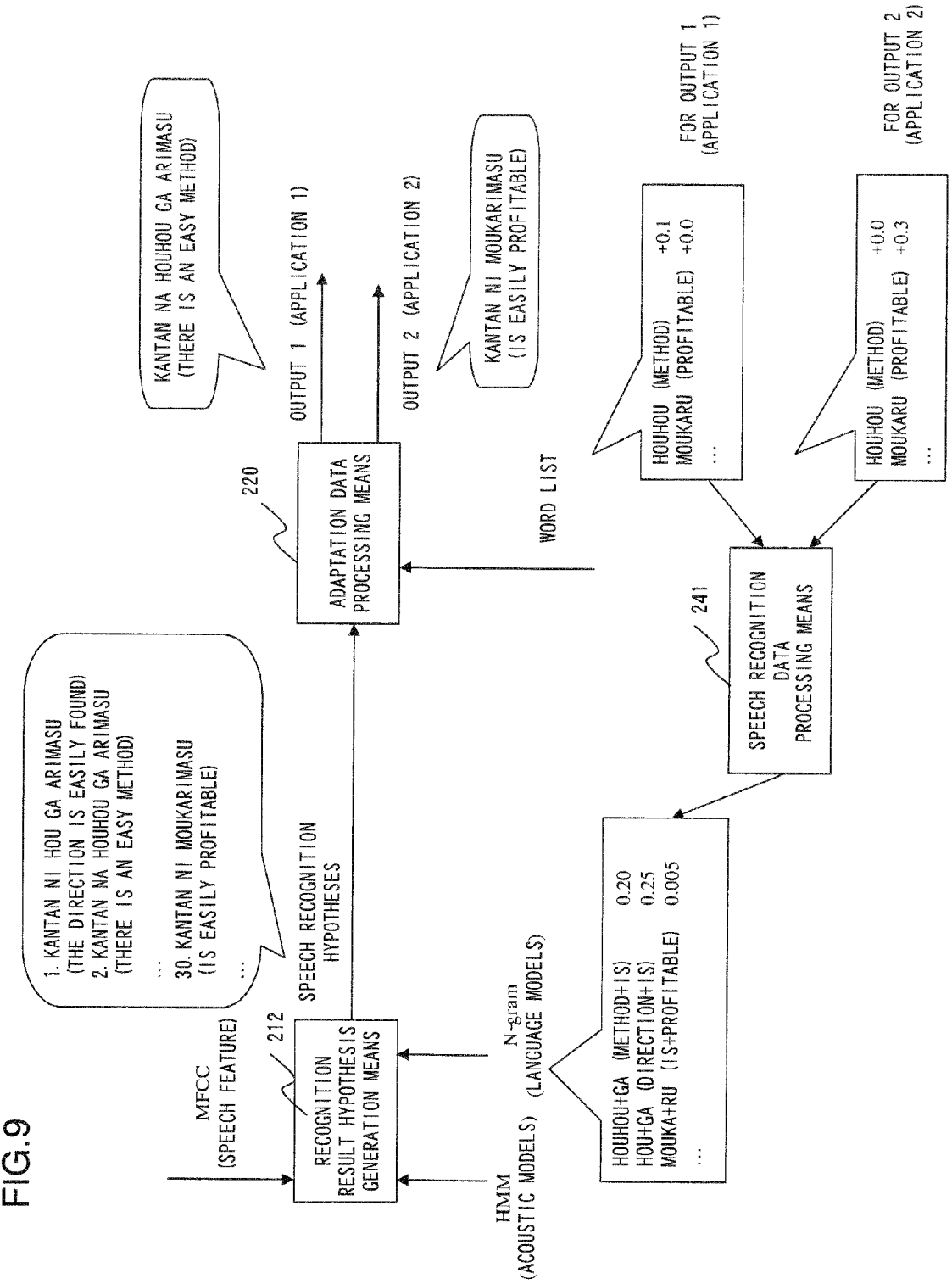
FIG. 9 is a diagram for explaining an operation of a third embodiment of the present invention.
Figure 10:
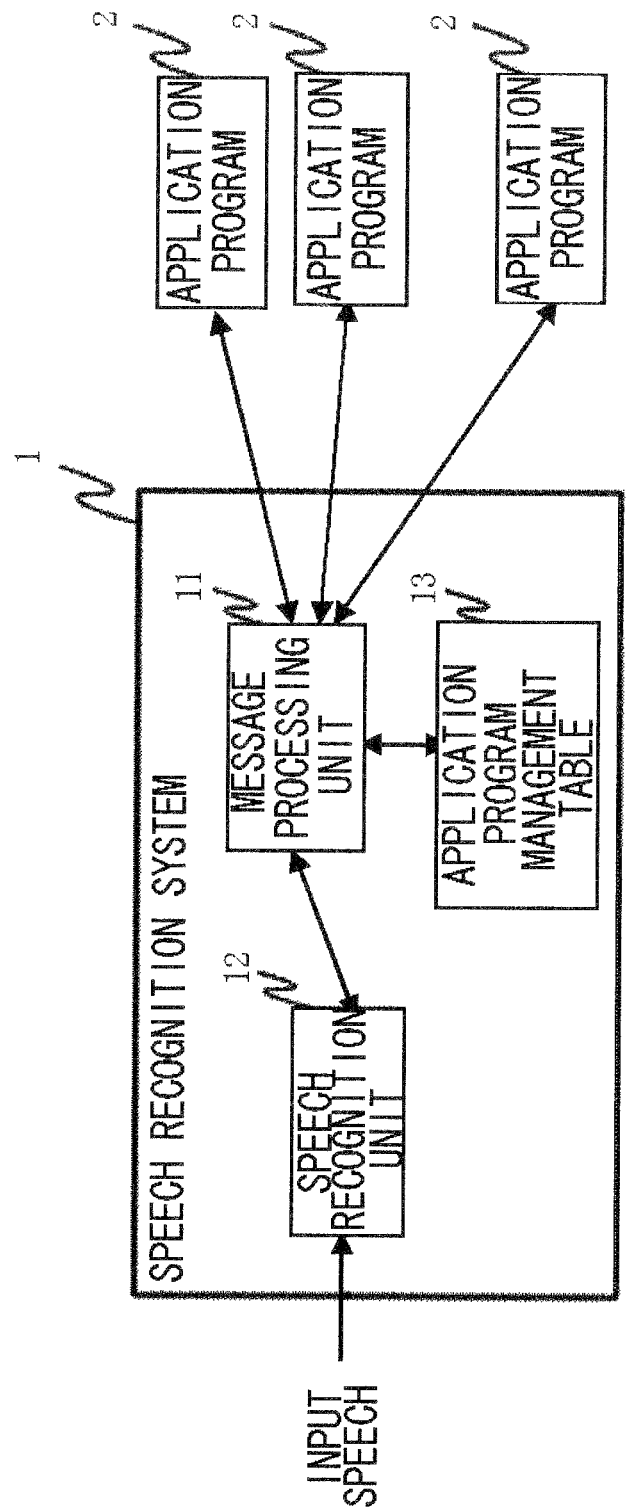
FIG. 10 is a diagram showing a configuration of Patent Document 1.

FIG. 9 is a schematic diagram showing an operation example of the third example of the present invention. The adaptation data means 220 in FIG. 9 corresponds to the adaptation data processing means 220 in the fourth exemplary embodiment shown in FIG. 5. The speech recognition data processing means 241 in FIG. 5 generates language models to be referred to by the common data processing means 210, in consideration of adaptation data for rescoring stored in the adaptation data storage unit 302. In this case, the speech recognition data processing means 241 obtains speech recognition data from the speech recognition data storage unit 301, and obtains the adaptation data (word lists for outputs 1 and 2) for the respective applications from the adaptation data storage unit 302. Then, the speech recognition data processing means 241 generates N-grams (where the occurrence probabilities of "houhou+ga (method+is)", "hou+ga (direction+is)", and "mouka+ru (is +profitable)" are 0.2, 0.25, and 0.005, respectively), as recognition data obtained by combining those speech recognition and adaptation data. Upon receipt of the feature of a speech (MFCCs) from the feature extraction means 211 in FIG. 5, the recognition result hypothesis generation means 212 refers to HMMs (acoustic models) and N-grams (language models) in the speech recognition data storage unit 301. The recognition result hypothesis generation means 212 then sorts candidates in descending order of likelihood. Then, as recognition result hypotheses (speech recognition hypotheses), the recognition result hypothesis generation means 212 outputs 1. "kantan ni hou ga arimasu (The direction is easily found).", 2. "kantan na houhou ga arimasu (There is an easy method).", . . . 30. "kantan ni moukarimasu (is easily profitable)", for example.

In this example, among the recognition result hypotheses indicated by reference numerals 1 through 30 listed above, the adaptation data processing means 220 selects and outputs to the corresponding application (indicated by reference numeral 401 in FIG. 5) the recognition result hypothesis of "kantan na houhou ga arimasu (There is an easy method)." having a highest score, for the output 1 (to an application 1), based on the word list for the output 1 (to the application 1) (where scores of "houhou (method)" and "moukaru (is profitable)" are +0.1 and +0.0, respectively) used as the adaptation data for rescoring. The adaptation data processing means 220 selects and outputs to the corresponding application (indicated by reference numeral 402 in FIG. 5) the recognition result hypothesis of "kantan ni moukarimasu (is easily profitable)" having a highest score, for the output 2 (to an application 2), based on the word list for the output 2 (to the application 2) (where scores of "houhou (method)" and "moukaru (is profitable)" are +0.0 and +0.3, respectively) used as the adaptation data for rescoring.

The above description was directed to the present invention in connection with the embodiments described above. The present invention is not limited to the configurations of the embodiments described above, and naturally includes various variations and modifications that could be made by those skilled in the art within the scope of the present invention.

The invention claimed is:

1. A speech recognition data processing device comprising:
a storage device;
a recognition result hypothesis generation processor that generates, with reference to the storage device, recognition result hypotheses based on a result of speech recognition of an input speech signal; and
an adaptation processor that rescores, with reference to the storage device, the recognition result hypotheses in a first manner according to a first output destination and simultaneously rescores the recognition result hypotheses in a second manner, different from the first manner, according to a second output destination;
the system generating for the first output destination a first recognition result of the input speech signal obtained through the recognition result hypotheses rescored in the first manner and simultaneously generating for the second output destination a second recognition result of the input speech signal obtained through the recognition result hypotheses rescored in the second manner, and outputting to the respective output destinations the first and second recognition results.

2. A speech recognition data processing device comprising:
a storage device;
a common data processor that generates, with reference to the storage device, recognition result hypotheses for a speech supplied from one speech input unit, the recognition result hypotheses not being biased to either a first application or a second application; and
an adaptation data processor that receives the recognition result hypotheses from the common data processing unit and that simultaneously generates, with reference to the storage device, a first recognition result specialized for the first application and a second recognition result, different from the first recognition result, specialized for the second application, and outputs the respective recognition results to the applications.

3. The system according to claim 2, comprising:
a storage device that stores therein speech recognition data on processing of a speech recognition process common to said first and second applications and data on adaptation processing of the speech recognition process that is mutually different in accordance with the respective applications; wherein
the common data processing unit includes:
a feature extraction unit that extracts a feature of a speech supplied from a speech input unit; and
a recognition result hypothesis generation unit that generates the recognition result hypotheses for the feature extracted by the feature extraction unit, using the speech recognition data on the common processing stored in the storage device; and wherein
the adaptation data processing unit includes:
a plurality of adaptation units that simultaneously generate recognition results individually specialized for the respective applications, using the data on the adaptation processing stored in the storage device, based on one of the recognition result hypotheses and supply the recognition results to the corresponding applications, respectively;
the recognition result hypothesis generation unit that generates the recognition result hypotheses being made common to the applications of the supply destinations.

4. The system according to claim 3, including:
an application that converts a call to characters, the application being capable of implementing recognition with higher accuracy when using language models of a recognition vocabulary which does not include expressions that seldom appear in a call; and
an application that detects an inappropriate speech, the application being capable of implementing recognition with higher accuracy when using language models where scores of inappropriate expressions that seldom appear in a call are set to be high;
the recognition result hypotheses output by the common data processing unit being set so as not to biased to a vocabulary of a specific one of the applications, and the adaptation unit specializing the recognition result hypotheses for each application and performing recalculation.

5. The system according to claim 3, wherein the storage device comprises:
a speech recognition data storage unit that stores therein acoustic models and language models as the data on the processing of the speech recognition process common to the respective applications; and an adaptation data storage unit that stores therein word weight information on recognition vocabularies and parameters for rescoring the recognition result hypotheses as the data on the processing of the speech recognition process that is different according to the each application.

6. The system according to claim 5, further comprising:
a speech recognition data processing unit that obtains the speech recognition data from the speech recognition data storage unit, obtains the data for adaptation on the each application from the adaptation data storage unit, and generates recognition data obtained by combining the speech recognition data and the data for adaptation.

7. The system according to claim 6, wherein the speech recognition data processing unit performs weighted combination of the language models or raises linguistic scores of a specific one of the recognition vocabularies.

8. The system according to claim 2, wherein the applications include an application that converts the input speech to characters and/or an application that extracts a predetermined expression from the input speech.

9. The system according to claim 2, wherein the applications include applications that obtain the speech recognition results and perform original processes, respectively; and
the applications include a plurality of types of:
an application that converts an operator's call to characters and displays the characters on a terminal of an operator;
an application that extracts a keyword from a call and performs information retrieval on the terminal of the operator;
an application that presents information on a call converted to characters on a terminal of a supervisor of the operator; and
an application that detects a situation that needs help for the operator and presents the situation on the terminal of the supervisor of the operator.

10. The system according to claim 2, wherein the applications include an application that converts a call to characters without alteration and an application that detects an inappropriate speech from the call.

11. The system according to claim 2, comprising:
a storage device that stores therein speech recognition data on processing of a speech recognition process common to the first and second applications and data on processing of the speech recognition process that is different according to each application; wherein
the common data processing unit includes:
a feature extraction unit that extracts a feature of a speech supplied from a speech input unit; and
a recognition result hypothesis generation unit that generates the recognition result hypotheses for the feature extracted by the feature extraction unit, using the speech recognition data on the common processing stored in the storage device, and wherein
the adaptation data processing unit includes:
an adaptation data management unit that obtains the speech recognition data from the storage device, obtains data on adaptation processing for the each application from the storage device, and generates data corresponding to the application of an adaptation destination and the adaptation processing for the application of the adaptation destination; and
a common adaptation unit that receives the recognition result hypotheses, executes the adaptation processing on the recognition result hypotheses in accordance with the each application, based on the data corresponding to the adaptation processing generated by the adaptation data management unit, and supplies the recognition results to the applications of supply destinations, respectively;
the common adaptation unit being made common to the applications of the supply destinations.

12. A speech recognition method comprising:
in a computer processor, rescoring recognition result hypotheses in a first manner according to a first output destination and simultaneously rescoring the recognition result hypotheses in a second manner, different from the first manner, according to a second output destination; and
the computer processor generating for the first output destination a first recognition result of an input speech signal obtained through the recognition result hypotheses rescored in the first manner and simultaneously generating for the second output destination a second recognition result of the input speech signal obtained through the recognition result hypotheses rescored in the second manner, and outputting to the output destinations the respective recognition results.

13. A speech recognition method comprising:
in a computer processor, generating recognition result hypotheses for a speech supplied from one speech input unit, the recognition result hypotheses not being biased to either a first application or a second application; and
the computer processor receiving the recognition result hypotheses and simultaneously generating a first recognition result specialized for the first application and a second recognition result, different from the first recognition result, specialized for the second application, and outputting the recognition results to the respective applications.

14. The method according to claim 13, wherein speech recognition data on processing of a speech recognition process common to the applications and data on adaptation processing of the speech recognition process that is mutually different in accordance with the respective applications are stored and held in a storage device; and wherein
the step of generating recognition result hypotheses includes:
extracting a feature of the speech supplied from the one speech input unit; and
generating the recognition result hypotheses for the extracted feature, using the speech recognition data on the common processing stored in the storage device; and
the step of receiving the recognition result hypotheses and generating and outputting recognition results includes:
simultaneously generating the recognition results suited for the applications, respectively, using the data on the adaptation processing stored in the storage device, based on one of the recognition result hypotheses, and outputting the generated recognition results to the corresponding applications, respectively.

15. The method according to claim 14, further comprising:
obtaining the speech recognition data and the data for adaptation on the each application from the storage device; and
combining the data for speech recognition and the data for adaptation to generate speech recognition process data.

16. The method according to claim 13, wherein the applications include an application that converts the input speech to characters and/or an application that extracts a predetermined expression from the input speech.

17. The method according to claim 13, wherein the applications include applications that obtain the speech recognition results and perform original processes, respectively; and
the applications include a plurality of types of:

an application that converts an operator's call to characters and displays the characters on a terminal of an operator;

an application that extracts a keyword from a call and performs information retrieval on the terminal of the operator;

an application that presents information on a call converted to characters on a terminal of a supervisor of the operator; and an application that detects a situation that needs help for the operator and presents the situation on the terminal of the supervisor of the operator.

18. The method according to claim 13, wherein the applications include an application that converts a call to characters without alteration and an application that detects an inappropriate speech from the call.

19. The method according to claim 13, wherein speech recognition data on processing of a speech recognition process common to the applications and data on processing of the speech recognition process that is different according to each application are stored and held in a storage device; and wherein the step of generating recognition result hypotheses includes:
extracting a feature of the speech supplied from the one speech input unit; and
generating the recognition result hypotheses for the extracted feature, using the speech recognition data on the common processing stored in the storage device; and
the step of receiving the recognition result hypotheses and generating and outputting recognition results includes:
obtaining the speech recognition data from the storage device, obtaining data on adaptation processing for the each application from the storage device, and generating data corresponding to the application of an adaptation destination and the adaptation processing for the application of the adaptation destination; and
receiving the recognition result hypotheses, executing the adaptation processing on the recognition result hypotheses, based on the generated data corresponding to the adaptation processing, and supplying the recognition results to the applications, respectively.

20. A non-transient computer readable medium storing instructions that cause a computer implementing a speech recognition device to execute the processing of:

rescoring recognition result hypotheses in a first manner according to a first output destination and simultaneously rescoring the recognition result hypotheses in a second manner, different from the first manner, according to a second output destination; and generating for the first output destination a first recognition result of an input speech signal obtained through the recognition result hypotheses rescored in the first manner and simultaneously generating for the second output destination a second recognition result of the input speech signal obtained through the recognition result hypotheses rescored in the second manner, and outputting to the output destinations the respective recognition results of the input speech signal.

21. A non-transient computer readable medium storing instructions that cause a computer implementing a speech recognition device to execute:

a first processing of generating recognition result hypotheses for a speech supplied from one speech input unit, the recognition result hypotheses not being biased to either a first application or a second application; and a second processing of receiving the recognition result hypotheses and simultaneously generating a first recognition result specialized for the first application and a second recognition result, different from the first recognition result, specialized for the second application, and outputting the recognition results to the respective applications.

22. The computer readable medium according to claim 21, wherein the computer includes:

a storage device that stores therein speech recognition data on processing of a speech recognition process common to the applications and data on adaptation processing of the speech recognition process that is mutually different in accordance with the respective applications; and wherein the first processing includes the processing of:
extracting a feature of the speech supplied from the one speech input unit; and
generating the recognition result hypotheses for the extracted feature, using the speech recognition data stored in the storage device; and
the second processing includes the process of:
generating the recognition results suited for the applications, respectively, using the data on the adaptation processing stored in the storage device, based on one of the recognition result hypotheses, and supplying the recognition results to the corresponding applications, respectively.

23. The computer readable medium according to claim 21, wherein the applications include an application that converts the input speech to characters and/or an application that extracting a predetermined expression from the input speech.

24. The computer readable medium according to claim 21, wherein the applications include applications that obtain the speech recognition results and perform original processes, respectively; and the applications include a plurality of types of:
an application that converts an operator's call to characters and displays the characters on a terminal of an operator;
an application that extracts a keyword from a call and performs information retrieval on the terminal of the operator;
an application that presents information on a call converted to characters on a terminal of a supervisor of the operator; and
an application that detects a situation that needs help for the operator and presents the situation on the terminal of the supervisor of the operator.

25. The computer readable medium according to claim 21, wherein the applications include an application that converts a call to characters without alteration and an application that detects an inappropriate speech from the call.

26. The computer readable medium according to claim 21, wherein the computer comprises:

a storage device that stores and holds therein speech recognition data on processing of a speech recognition process common to the applications and data on adaptation processing of the speech recognition process that is mutually different according to each of the applications; and wherein the first processing includes the processing of:
extracting a feature of the speech supplied from the one speech input unit; and
generating the recognition result hypotheses for the extracted feature, using the speech recognition data on the processing common to the applications, stored in the storage device; and the second processing includes the processing of:

obtaining the speech recognition data from the storage device, obtaining the data on adaptation processing for the each of the applications from the storage device, and generating data corresponding to the application of an adaptation destination and the adaptation processing for the application of the adaptation destination; and receiving the recognition result hypotheses, executing the adaptation processing on the recognition result hypotheses based on the generated data corresponding to the adaptation processing, and supplying the recognition results to the applications, respectively.

27. A processing device comprising:

a common data processing device which includes:

a feature extraction unit that extracts a feature of a speech signal supplied from one input speech unit; and a recognition result hypothesis generation unit that searches for word sequences using acoustic models and language models stored in a storage device in advance and generates recognition result hypotheses not biased to either a first application or a second application;

the common data processing unit being provided in common to the applications, each of which obtains a speech recognition result and performs a process; and a plurality of adaptation units that refer to a vocabulary, a word dictionary for rescoring including the vocabulary and word weight information, or language models used in each application for the each application, rescore the recognition result hypotheses in a first manner according to a first output destination and simultaneously rescore the recognition result hypotheses in a second manner, different from the first manner, according to a second output destination, generate for the first output destination a first recognition result of the input speech signal obtained through the recognition result hypotheses rescored in the first manner and simultaneously generate for the second output destination a second recognition result of the input speech signal obtained through the recognition result hypotheses rescored in the second manner, and supply the speech recognition results to the corresponding applications, respectively.

28. The device according to claim 27, comprising a plurality of the adaptation units corresponding to the first and second applications, respectively.

29. The device according to claim 27, comprising:

a unit that switches the word dictionary for rescoring, according to one of the applications to which the speech recognition result is output;

the adaptation units being made common to the applications.

30. The device according to claim 27, comprising:

a unit that generates language models for speech recognition from a word list of the word dictionary for rescoring.

31. A system comprising a server for speech recognition that receives a speech signal and supplies speech recognition results to the first and second applications, the applications operating in response to one speech input, the system comprising:

the processing device according to claim 27 as the server for speech recognition.

* * * * *